(12) United States Patent
Herda et al.

(10) Patent No.: US 6,274,532 B1
(45) Date of Patent: Aug. 14, 2001

(54) METHOD OF MAKING A COMPLETELY-METALLIC OXIDATION CATALYST

(75) Inventors: Wilfried Herda, Düsseldorf; Ulrich Heubner, Werdohl; Jürgen Koppe, Schkopau; Hartmut Lausch, Halle, all of (DE)

(73) Assignee: Krupp VDM GmbH, Werdohl (DE)

( * ) Notice: Subject to any disclaimer, the term of this patent is extended or adjusted under 35 U.S.C. 154(b) by 0 days.

(21) Appl. No.: 09/230,466
(22) PCT Filed: Jul. 23, 1997
(86) PCT No.: PCT/EP97/03976
   § 371 Date: Sep. 30, 1999
   § 102(e) Date: Sep. 30, 1999
(87) PCT Pub. No.: WO98/04347
   PCT Pub. Date: Feb. 5, 1998

(30) Foreign Application Priority Data

Jul. 26, 1996 (DE) .............................. 196 30 250

(51) Int. Cl.[7] .............................. B01J 21/00; B01J 23/00; B01J 23/16; B01J 23/70; B01J 23/88
(52) U.S. Cl. .......................... 502/314; 502/308; 502/309; 502/311; 502/312; 502/313; 502/315; 502/316; 502/318; 502/320; 502/322; 502/323; 502/324; 502/331; 502/332; 502/335; 502/336; 502/346; 502/349; 502/351; 502/353; 502/354; 502/355
(58) Field of Search .................................. 502/305, 308, 502/311, 313, 324, 318, 325, 323, 330, 332, 337, 338, 349, 350, 309, 312, 314, 315, 316, 320, 322, 331, 335, 336, 346, 351, 353, 354, 355

(56) References Cited

U.S. PATENT DOCUMENTS

| | | | |
|---|---|---|---|
| 3,922,872 | * | 12/1975 | Reilly et al. . |
| 3,925,259 | * | 12/1975 | Kane . |
| 3,953,367 | * | 4/1976 | Hoffmann et al. . |
| 4,116,884 | * | 9/1978 | Hayashi et al. . |
| 4,252,690 | * | 2/1981 | Kamiya et al. . |
| 5,733,838 | * | 3/1998 | Vicari et al. . |

FOREIGN PATENT DOCUMENTS

| | | | |
|---|---|---|---|
| 4416469C1 | | 9/1995 | (DE) . |
| 19503865 | | 4/1996 | (DE) . |
| 19651807 | * | 6/1998 | (DE) . |
| 0753345A2 | | 1/1997 | (EP) . |
| 841091 | * | 5/1998 | (EP) . |
| 309743 | | 4/1929 | (GB) . |
| 58-51941 | * | 3/1983 | (JP) . |

* cited by examiner

Primary Examiner—Steven P. Griffin
Assistant Examiner—Christina Ildebrando
(74) Attorney, Agent, or Firm—Venable; Gabor J. Kelemen

(57) ABSTRACT

A completely metallic catalyst for the oxidation of mixtures in the gaseous phase which contain carbon monoxide, hydrocarbons and/or soot, has a surface doped with a metallic element and is subjected to a second thermal treatment in an oxygen-containing atmosphere.

4 Claims, No Drawings

METHOD OF MAKING A COMPLETELY-METALLIC OXIDATION CATALYST

The invention relates to a method of making a completely-metallic catalyst for the oxidation of mixtures containing carbon monoxide and/or hydrocarbons and/or soot in the gaseous phase.

DE 44 16 469 C1 discloses a completely-metallic oxidation catalyst that contains nickel, manganese, chromium and iron and is used in the total oxidation of hydrocarbons into carbon dioxide and water. This catalyst is produced from an alloy, which contains (in mass percent) 10 to 50% nickel, up to 50% copper, up to 10% manganese, 10 to 30% chromium and up to 50% iron, through thermal treatment in an oxygen-containing atmosphere for a period of 0.25 to 10 hours at temperatures of 400 to 1000° C. A reduction with a hydrocarbon-containing mixture can follow this oxidizing thermal treatment.

A disadvantage of this and other known oxidation catalysts is that they do not oxidize the organic components in gas flows below 400° C., and soot particles in particular are not oxidized in the temperature range below 500° C.

Thus, in the presence of soot particles, the danger exists that the catalyst surface will be covered by soot particles at relatively-low working temperatures below 500° C. such that they no longer have a catalytic effect. This is inevitably the case when an exhaust-gas catalyst is not used in the optimum working and temperature range, for example during the startup phase of motor-vehicle diesel catalysts. For these and numerous other applications, it is preferable for the catalyst to already have a catalytic effect in the relatively "cold" phase, i.e., at temperatures of up to 300° C.

It is the object of the invention to provide an effective catalyst for the total oxidation of gas mixtures containing hydrocarbons and/or soot, the catalyst being simple to produce and easy to dispose of, already having a catalytic effect in a low temperature range, being regenerable with little effort, and simultaneously possessing a high thermal conductivity.

This object is accomplished by a method of making a completely-metallic catalyst for the oxidation of mixtures containing carbon monoxide and/or hydrocarbons and/or soot in the gaseous phase, the catalyst comprising an alloy containing at least three of the following elements: manganese, nickel, copper, cobalt, chromium, molybdenum, tungsten, titanium, zirconium, vanadium, niobium, aluminum, and iron with a total content for these elements of at least 95 mass percent, and up to 5 mass percent of phosphorus, nitrogen, silicon, carbon, and sulfur, wherein the alloy is subjected to a first oxidizing thermal treatment in an oxygen-containing atmosphere at a temperature of 250° C. to 1250° C. for 0.05 to 5 hours. After cooling, the alloy is treated with an aqueous solution or emulsion containing an oxidizable, organic substance, with the surface and/or regions near the surface of the alloy being doped with one of the following elements: boron, aluminum, indium, germanium, tin, lead, scandium, yttrium, lanthanum, titanium, zirconium, vanadium, niobium, chromium, molybdenum, tungsten manganese, technetium, rhenium, iron, cobalt, nickel, copper, cerium, praseodymium, or neodymium. The alloy is subsequently subjected to a further thermal treatment in an oxygen containing atmosphere over a period of 5 minutes to 3 hours at a temperature of 250° C. to 1250° C.

The catalyst can be used in wire or chip form, or any other form having a sufficiently-large specific surface.

The catalyst of the invention makes use of a layer that adheres well and has a high degree of catalytic effectiveness, and has a high catalytic activity and a high thermal conductivity.

In the catalysts of the invention, a possible drop in the catalytic activity—possibly following a mechanical, chemical or physical-chemical cleaning of the surface—can be eliminated through a repeated thermal treatment followed by another treatment with an aqueous solution containing oxidizable, organic substances, e.g. sugar, starch, latex, polyacrylate and/or polyvinyl alcohol, and another modification with at least one of the following elements: boron, aluminum, indium, germanium, tin, lead, scandium, yttrium, lanthanum, titanium, zirconium, vanadium, niobium, chromium, molybdenum, tungsten, manganese, technetium, rhenium, iron, cobalt, nickel, copper, cerium, praseodymium and neodymium in the above-described manner.

The consumed, and no longer regenerable, catalyst is melted and processed again into the catalyst of the invention.

The invention is explained by the following examples (all values in mass percent).

EXAMPLES

Respectively 2.0 g catalyst in wire form having a diameter of 0.25 mm were placed in a tubular reactor. The experiments were performed at different temperatures and with a pressure of 1 bar under the following loads: 10 Nl/h air with 5,000 ppm of one of the following hydrocarbons.

| Hydrocarbon | Catalyst | T [° C.] | Conv. to $CO_2$ and $H_2O$ [%] |
|---|---|---|---|
| Example 1: n-hexane | An alloy comprising 56.6% Fe, 16.5% Cr, 24.2% Mn, 1.0% Mo, 0.8% Cu, 0.40% N, remainder Ni, Ti, Nb, Al, C, P, was annealed for 1 hr at 875° C. with air. After cooling, the alloy was placed in 10 ml of an aqueous solution containing 1.5% polyvinyl alcohol, 50 g/l $Cu^{2+}$ ions and 10 mg/l $Mn^{2+}$ ions for 15 min., removed and annealed again for 1 hr at 450° C. in air. | 350 | 100 |
| Example 2: benzene | An alloy comprising 71.8% Mn, 17.55% Cu, 10.4% Ni, 0.1% Fe, 0.04% Si, 0.009% S and 0.017% C was annealed for 1.5 hrs at 650° C. in an air-containing environment. After cooling, the alloy was placed in an aqueous solution containing 2% starch and 200 g/l $Cu^{2+}$ ions for 15 min., removed and annealed again for 1 hr at 500° C. in air. | 350 | 100 |
| Example 3: n-hexane | An alloy comprising 71.8% Mn, 17.55% Cu, 10.4% Ni, 0.1% Fe, 0.04% Si, 0.009% S and 0.017% C was annealed for 1.5 hrs at 650° C. in an air-containing environment. After cooling, the alloy was placed in an aqueous solution containing 2 g/l $Cu^{2+}$ ions for 10 min., then in a 2% polyvinyl-alcohol solution, removed and annealed again for 1 hr at 500° C. in air. | 300 | 92 |
| Example 4: toluene | An alloy comprising 53.72% Fe, 24.2% Cr, 17.7% Ni, 6.14% Mn, 4.34% Mo, 0.53% Cu, 0.17% Nb, 0.12% Al, 0.46% N, 0.004% S, 0.012% C and 0.017% P was annealed for 2 hrs at 900° C. with air. After cooling, the alloy was placed in 10 ml of an aqueous solution containing 1% polyvinyl alcohol, 100 g/l $Fe^{3+}$ ions, 100 g/l $Cu^{2+}$ ions and 2 g/l $Mo^{6+}$ ions for 10 min., removed and | 350 | 100 |

-continued

| Hydrocarbon | Catalyst | T [° C.] | Conv. to $CO_2$ and $H_2O$ [%] |
|---|---|---|---|
| | annealed again for 1 hr at 700° C. in air. | | |
| Example 5: n-hexane | An alloy comprising 50.85% Co, 19.95% Cr, 14.8% W, 2.28% Fe, 1.53% Mn, 0.096% C, 0.004% S and 0.006% P was annealed for 0.45 hr at 1000° C. with air. After cooling, the alloy was placed in 10 ml of a 5% aqueous crystallized-sugar solution for 3 min., then placed in a solution containing 150 g/l $Cu^{2+}$ ions, 5 g/l $W^{6+}$ ions and 25 g/l $Co^{2+}$ ions, removed and annealed again for 1 hr at 725° C. in air. | 325 | 100 |
| Example 6: n-hexane | An alloy comprising 68.01% Cu, 30.6% Ni, 0.70% Fe, 0.67% Mn, 0.008% C, 0.010% Zn, 0.004% S and 0.002% P was annealed for 1.2 hrs at 875° C. with air. After cooling, the alloy was placed in 10 ml of an aqueous solution containing 5% crystallized sugar, 0.5% polyvinyl and 20 g/l $Cu^{2+}$ ions for 2 minutes, removed and annealed again for 1 hr at 725° C. in air. | 385 | 94 |
| Example 7: n-hexane | An alloy comprising 37.3% Ni, 35.73% Fe, 19.45% Cr, 3.2% Cu, 2.33% Mo, 1.51% Mn, 0.2% Nb, 0.26% Si, 0.015% P, 0.006% C and 0.003% S was annealed for 2 hrs at 910° C. with air. After cooling, the alloy was placed in a 1% aqueous polyvinyl-alcohol solution for 2.5 min., then placed in a solution containing 150 g/l $Cu^{2+}$ ions, removed and annealed again for 1 hr at 880° C. in air. | 315 | 96 |
| Example 8: n-hexane | An alloy comprising 61.05% Ni, 22.5% Cr, 15.3% Mo, 0.68% Fe, 0.26% Al, 0.14% Mn, 0.03% Co, 0.006% C, 0.004% P and 0.002% S was annealed for 1 hr at 880° C. with air. After cooling, the alloy was placed in a solution containing 1.3% polyvinyl alcohol, 100 g/l $Cu^{2+}$ ions and 5 g/l $V^{4+}$ ions for 4 min., removed and annealed again for 1 hr at 450° C. in air. | 375 | 85 |
| Example 9: n-hexane | An alloy comprising 45.64% Fe, 24.7% Ni, 20.9% Cr, 6.43% Mo, 0.90% Cu, 0.89% Mn, 0.192% N, 0.017% P, 0.006% C and 0.003% S was annealed for 0.5 hr at 1010° C. with air. After cooling, the alloy was placed in an aqueous solution containing 1.5% starch and 0.2% polyvinyl alcohol for 3 min., then in a solution containing 10 g/l $Cu^{2+}$ ions, 1 g/l $W^{6+}$ ions, 1 g/l Al ions and 1 g/l $Mn^{2+}$ ions, removed and annealed again for 1.5 hrs at 460° C. in air. | 370 | 80 |
| Example 10: n-hexane | An alloy comprising 32.08% Fe, 31.3% Ni, 26.85% Cr, 1.54% Mn, 1.34% Cu, 0.202% N, 0.015% P, 0.01% C and 0.003% S was annealed for 2 hrs at 825° C. with air. After cooling, the alloy was placed in 10 ml of a solution containing 1.5% polyvinyl alcohol, 60 g/l $Cu^{2+}$ ions and 10 g/l $Ni^{2+}$ ions for 2 min., removed and annealed again for 0.5 hr in air. | 385 | 95 |

What is claimed is:

1. A method of making a metallic catalyst for the oxidation of mixtures containing at least one of carbon monoxide, hydrocarbons and soot in a gaseous phase; the catalyst comprising an alloy containing at least three elements selected from the group consisting of manganese, nickel, copper, cobalt, chromium, molybdenum, tungsten, titanium, zirconoum, vanadium, niobium, aluminum and iron with a total content for said at least three elements of at least 95 mass percent, and up to 5 mass percent of at least one of phosphorous, nitrogen, silicon, carbon and sulfur; the method comprising the following steps:

(a) subjecting said alloy to a first, oxidizing thermal treatment in an oxygen-containing atmosphere at a temperature of 250° C. to 1250° C. for 0.05 to 5 hours;

(b) after cooling, treating the alloy with an aqueous solution or emulsion containing an oxidizable, organic substance;

(c) doping one of the surface and regions near the surface of the alloy with an element selected from the group consisting of boron, aluminum, indium, germanium, tin, lead, scandium, yttrium, lanthanum, titanium, zirconium, vanadium, niobium, chromium, molybdenum, tungsten, manganese, technetium, rhenium, iron, cobalt, nickel, copper, cerium, praseodymium and neodymium; and (d) subjecting the alloy to a second thermal treatment in an oxygen-containing atmosphere over a period of 5 minutes to 3 hours at a temperature of 250° C. to 1250° C.

2. The method as defined in claim 1, further comprising a step of adding said element of step (c) in a concentration corresponding at the most to a saturation concentration of the metallic catalyst.

3. The method as defined in claim 1, further comprising the step of adding said element of step (c) to said aqueous solution or emulsion before the treating step (b) in an intermediate thermal treatment at a temperature range of 30° C. to 1250° C.

4. The method as defined in claim 1, further comprising the step of adding said element of step (c) to said aqueous solution or emulsion after the treating step (b) in an intermediate thermal treatment at a temperature range of 30° C. to 1250° C.

* * * * *